United States Patent
Marutzky

(10) Patent No.: US 11,572,179 B2
(45) Date of Patent: Feb. 7, 2023

(54) CABIN ATTENDANT AIRCRAFT TRAY TABLE

(71) Applicant: AMI Industries, Inc., Colorado Springs, CO (US)

(72) Inventor: Kyler J. Marutzky, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 127 days.

(21) Appl. No.: 17/122,626

(22) Filed: Dec. 15, 2020

(65) Prior Publication Data

US 2022/0185484 A1 Jun. 16, 2022

(51) Int. Cl.
B64D 11/06 (2006.01)

(52) U.S. Cl.
CPC ...... B64D 11/0691 (2014.12); B64D 11/0638 (2014.12)

(58) Field of Classification Search
CPC .................. B64D 11/0691; B64D 11/0638
See application file for complete search history.

(56) References Cited

U.S. PATENT DOCUMENTS

| | | | |
|---|---|---|---|
| 7,963,231 B2 * | 6/2011 | Osborne | A47B 5/006 108/42 |
| 8,770,659 B2 * | 7/2014 | Isherwood | B64D 11/0691 297/14 |
| 8,794,162 B2 | 8/2014 | Hisata et al. | |
| 9,102,409 B2 | 8/2015 | Weil et al. | |
| 9,415,874 B2 | 8/2016 | Curtis et al. | |
| 9,446,849 B1 * | 9/2016 | Pinkal | B60N 2/3015 |
| 10,273,009 B2 | 4/2019 | Fishel et al. | |
| 10,301,028 B2 | 5/2019 | Stephens et al. | |
| 10,363,854 B2 | 7/2019 | Lamb et al. | |
| 10,494,100 B2 | 12/2019 | Jussli et al. | |

(Continued)

FOREIGN PATENT DOCUMENTS

| | | | |
|---|---|---|---|
| DE | 3634839 A1 | 4/1988 | |
| DE | 4343242 A1 | 6/1995 | |

(Continued)

OTHER PUBLICATIONS

Extended Search Report in European Application No. 21213886.1 dated Apr. 26, 2022, 8 pages.

*Primary Examiner* — Brady W Frazier
*Assistant Examiner* — Shanna Danielle Glover
(74) *Attorney, Agent, or Firm* — Suiter Swantz pc llo

(57) ABSTRACT

A cabin attendant aircraft tray table may include a front section of a body, a rear section of the body, and at least one hinge coupling the front section and the rear section. The front section may be configured to actuate relative to the rear section via the at least one hinge between a stowed position, a personal electronic device (PED) position, and a tray position. The cabin attendant aircraft tray table may be stowable in a cavity defined within a frame of a cabin attendant aircraft seat assembly when the front section is in the stowed position. The front section may be held in place relative to the rear section via a mechanical assembly when the front section is in the PED position, and may be configured to receive and support a PED when the front section is in the PED position.

14 Claims, 19 Drawing Sheets

(56) References Cited

U.S. PATENT DOCUMENTS

| | | | |
|---|---|---|---|
| 2011/0011979 A1* | 1/2011 | Weil ................... | B64D 11/0638 |
| | | | 297/135 |
| 2018/0281966 A1 | 10/2018 | Chuang et al. | |
| 2018/0354398 A1 | 12/2018 | Lamb et al. | |
| 2019/0061953 A1 | 2/2019 | Fishel et al. | |
| 2020/0017220 A1 | 1/2020 | Wanner et al. | |
| 2020/0290523 A1* | 9/2020 | Pajic ................... | B64D 11/0638 |

FOREIGN PATENT DOCUMENTS

| | | | |
|---|---|---|---|
| WO | 0192055 A1 | 12/2001 | |
| WO | 2017147620 A1 | 8/2017 | |
| WO | WO-2017147620 A1 * | 8/2017 | |

\* cited by examiner

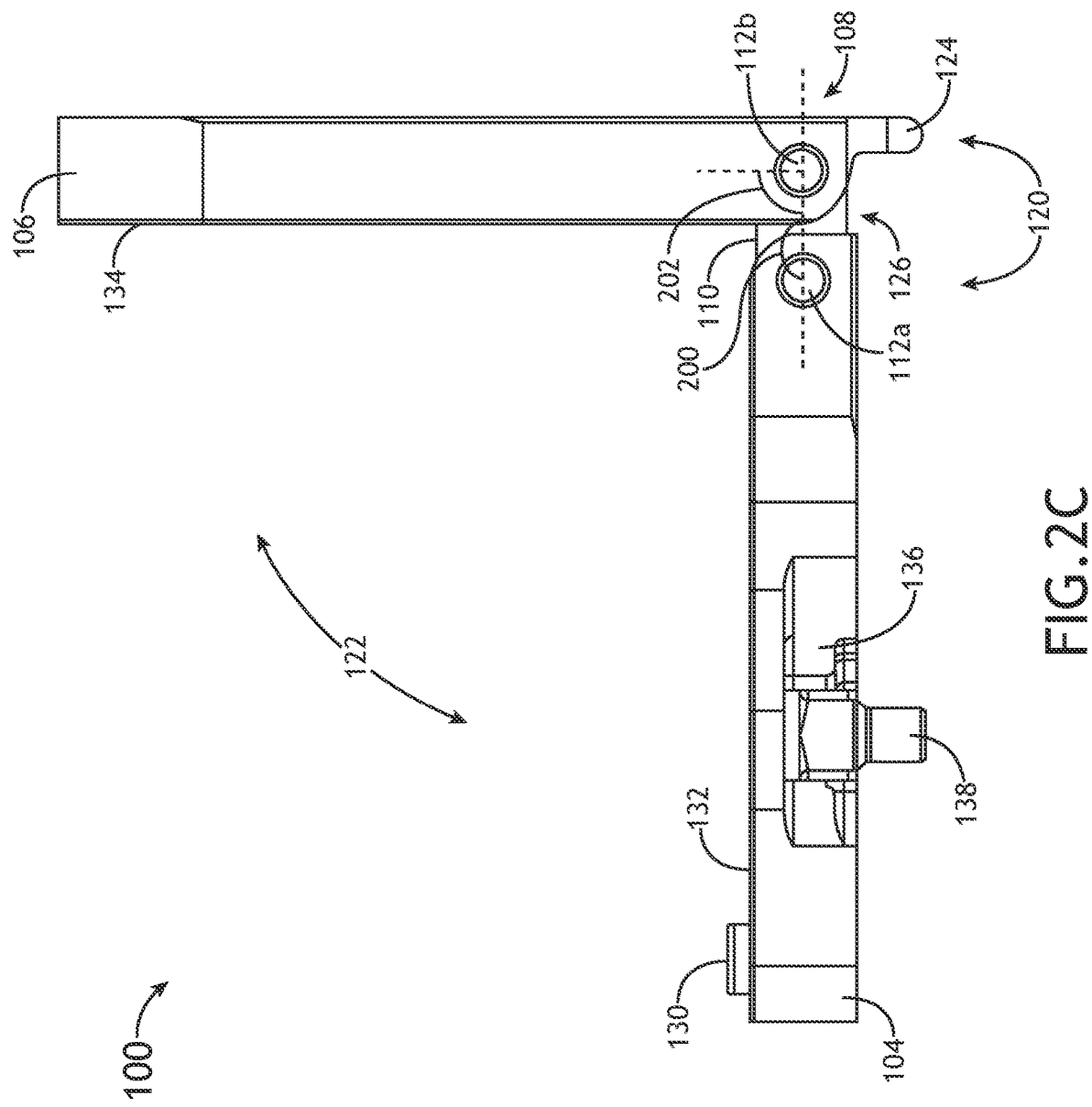

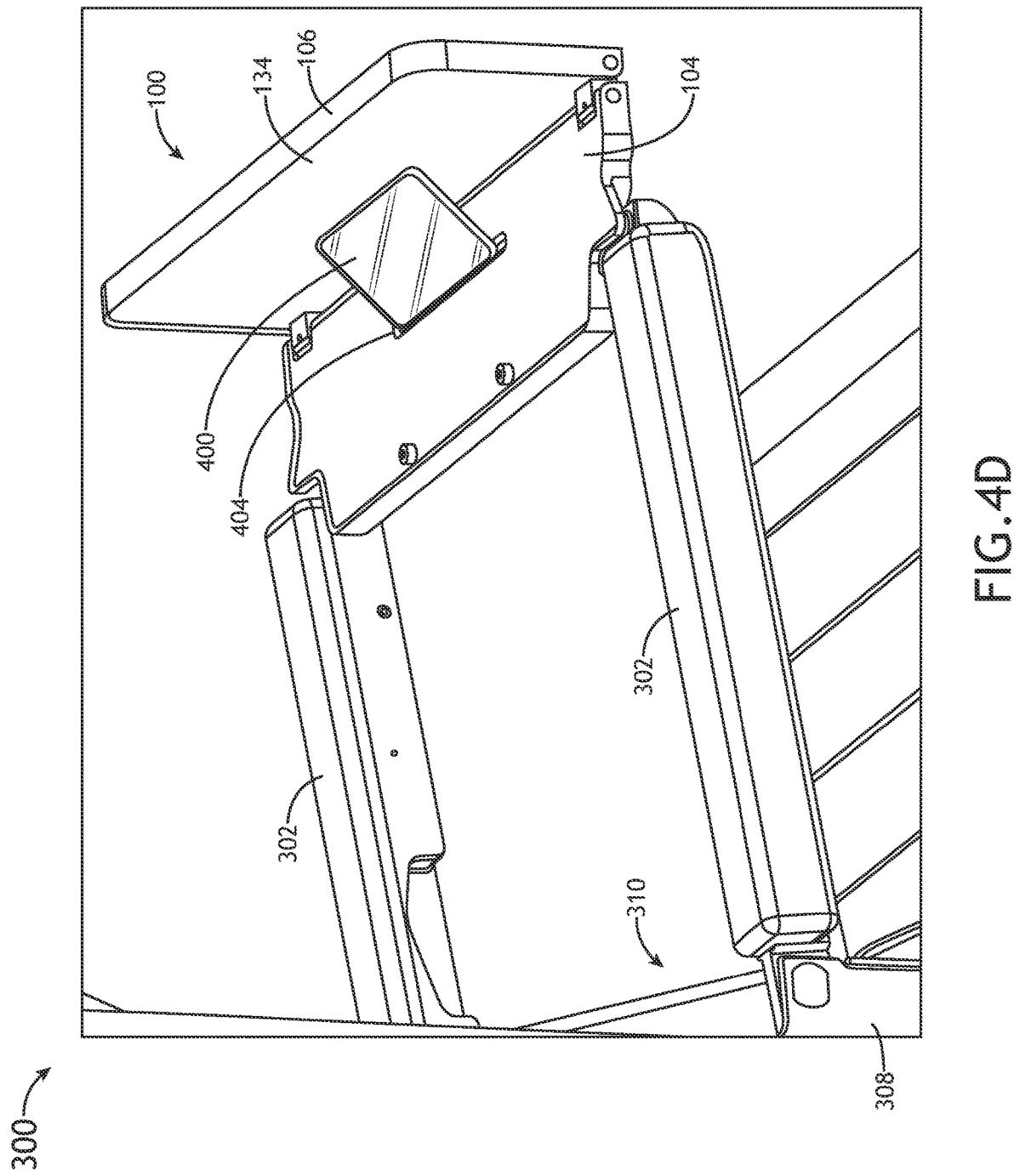

CABIN ATTENDANT AIRCRAFT TRAY TABLE

BACKGROUND

Aircraft may include aircraft tray tables for cabin attendants to use at their cabin attendant aircraft seat during rest periods. As the cabin attendant seat is often in an aisle, a walkway, a galley, and/or an entrance to/egress from the aircraft, the footprint of the cabin attendant aircraft seat may be reduced in at least one dimension due to space limitations while also needing to address factors such as ease of access, having to meet aircraft guidelines and/or standards, and the like.

SUMMARY

A cabin attendant aircraft tray table is disclosed, in accordance with one or more embodiments of the disclosure. The cabin attendant aircraft tray table may include a front section of a body with a first upper surface. The cabin attendant aircraft tray table may include a rear section of the body with a second upper surface. The cabin attendant aircraft tray table may include at least one hinge coupling the front section and the rear section. The front section may be configured to actuate relative to the rear section via the at least one hinge between a stowed position, a personal electronic device (PED) position, and a tray position. The front section and the rear section may be in separate planes when the front section is in the stowed position. The first upper surface of the front section may be proximate to the second upper surface of the rear section when the front section is in the stowed position. The front section may be held in place relative to the rear section via a mechanical assembly when the front section is in the PED position. The front section and the rear section may be configured to receive and support a PED when the front section is in the PED position. The first upper surface of the front section and the second upper surface of the rear section may form a co-planar surface when the front section is in the tray position.

In some embodiments, the cabin attendant aircraft tray table may include at least one bumper coupled to the second upper surface of the rear section. The at least one bumper may be configured to receive and support the PED when the front section is in the PED position.

In some embodiments, the cabin attendant aircraft tray table may include at least one recess inset within the second upper surface of the rear section. The at least one recess may be configured to support the PED when the front section is in the PED position.

In some embodiments, the at least one hinge may include a hinge body. The at least one hinge may include a first shaft coupling the front section to the hinge body. The first shaft may include at least one bearing. The at least one hinge may include a second shaft coupling the rear section to the hinge body. The second shaft may include at least one bearing.

In some embodiments, the mechanical assembly may include at least one ball detent. The at least one ball detent being configured to engage at least one notch on the hinge body when the front section is in at least one of the stowed position or the PED position.

In some embodiments, a first angle between the front section and the hinge body may be configured to remain unchanged as the front section actuates between the stowed position and the PED position. A second angle between the rear section and the hinge body may be configured to change as the front section actuates between the stowed position and the PED position.

In some embodiments, a first angle between the front section and the hinge body may be configured to change as the front section actuates between the PED position and the tray position. A second angle between the rear section and the hinge body may be configured to remain unchanged as the front section actuates between the PED position and the tray position.

In some embodiments, the cabin attendant aircraft tray table may include an interlocking assembly with a first component on the front section and a second component on the rear section. An engaging by a first surface on the first component of a second surface on the second component may prevent the front section from actuating past the tray position where the front section and the rear section are co-planar.

In some embodiments, the cabin attendant aircraft tray table may include at least one fitting coupled to the rear section. The at least one fitting may be configured to be inserted into at least one corresponding receiver on at least one armrest of a cabin attendant aircraft seat assembly. The cabin attendant aircraft tray table may be stowable in a cavity defined within a frame of the cabin attendant aircraft seat assembly when the front section is in the stowed position.

A cabin attendant aircraft seat assembly is disclosed, in accordance with one or more embodiments of the disclosure. The cabin attendant aircraft seat assembly may include a frame. The cabin attendant aircraft seat assembly may include a cabin attendant aircraft seat coupled to the frame. The cabin attendant aircraft seat assembly may include at least one armrest proximate to the cabin attendant aircraft seat and coupled to the frame. The cabin attendant aircraft seat assembly may include a cabin attendant aircraft tray table. The cabin attendant tray table may include a front section of a body with a first upper surface. The cabin attendant tray table may include a rear section of the body with a second upper surface. The cabin attendant tray table may include at least one fitting coupled to the rear section. The at least one fitting may be configured to be inserted into at least one corresponding receiver on the at least one armrest. The cabin attendant tray table may include at least one hinge coupling the front section and the rear section. The front section may be configured to actuate relative to the rear section via the at least one hinge between a stowed position, a personal electronic device (PED) position, and a tray position. The cabin attendant aircraft tray table may be stowable in a cavity defined within the frame when the front section is in the stowed position. The front section may be held in place relative to the rear section via a mechanical assembly when the front section is in the PED position. The front section and the rear section may be configured to receive and support a PED when the front section is in the PED position. The first upper surface of the front section and the second upper surface of the rear section may form a co-planar surface when the front section is in the tray position.

In some embodiments, the cabin attendant aircraft seat assembly may include at least one cut-out within the frame. The at least one cut-out may provide access to the cavity defined within the frame in which the cabin attendant aircraft tray table is stowable when the front section is in the stowed position.

In some embodiments, the at least one cut-out may conform to a perimeter of the cabin attendant aircraft tray table defined when the front section is in the stowed position. The perimeter may include at least one projection corresponding to at least one feature of the cabin attendant aircraft tray table. The at least one feature may include the at least one fitting.

In some embodiments, the frame may include a first set of rails within the defined cavity. The first set of rails may be configured to receive a first portion of the cabin attendant aircraft tray table. The frame may include a second set of rails within the defined cavity. The second set of rails may be configured to receive a second portion of the cabin attendant aircraft tray table.

In some embodiments, the first set of rails may include two rails with co-planar surfaces configured to receive the first portion of the cabin attendant aircraft tray table. The second set of rails may include two rails with surfaces separated by a select distance and configured to receive the second portion of the cabin attendant aircraft tray table.

In some embodiments, the front section and the rear section of the cabin attendant aircraft tray table may be in separate planes when the front section is in the stowed position. The first upper surface of the front section may be proximate to the second upper surface of the rear section when the front section is in the stowed position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2C illustrates an elevation view of a cabin attendant aircraft tray table, in accordance with one or more embodiments of the disclosure, in accordance with one or more embodiments of the disclosure;

FIG. 4D illustrates a perspective view of a cabin attendant aircraft set assembly, a cabin attendant tray table, and a personal electronic device (PED), in accordance with one or more embodiments of the disclosure.

DETAILED DESCRIPTION OF THE INVENTION

Figure 1A:
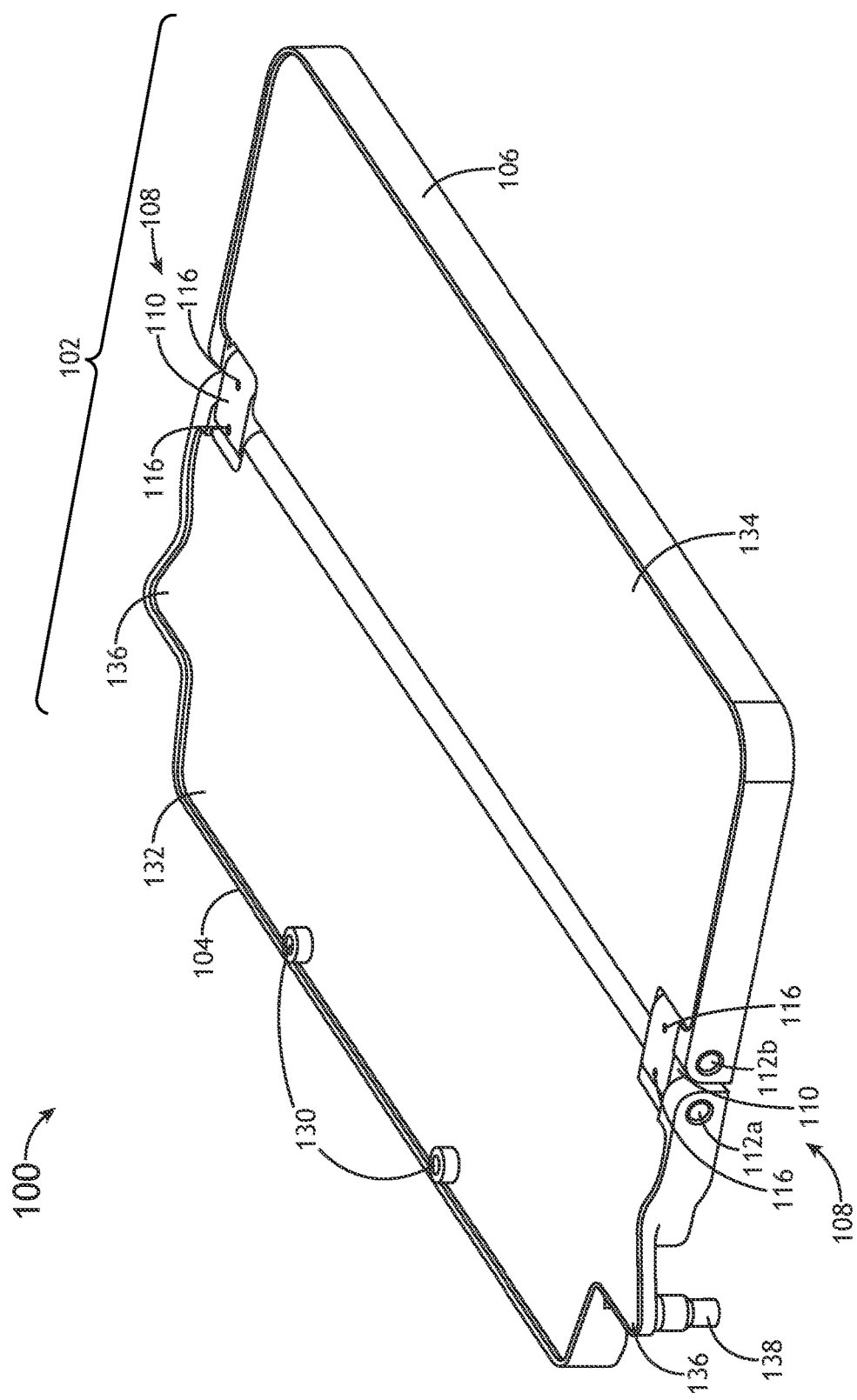
FIG. 1A illustrates a perspective view of a cabin attendant aircraft tray table, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-4D in general illustrate a cabin attendant aircraft tray table, in accordance with one or more embodiments of the disclosure.

Aircraft may include aircraft tray tables for cabin attendants to use at their cabin attendant aircraft seat during rest periods. As the cabin attendant seat is often in an aisle, a walkway, a galley, and/or an entrance to/egress from the aircraft, the footprint of the cabin attendant aircraft seat may be reduced in at least one dimension due to space limitations while also needing to address factors such as convenience, ease of access, user comfort, and the like.

For example, the aircraft tray table may need to be stowed on-seat for convenience and ease of access, while maintaining a cabin attendant aircraft seat footprint. By way of another example, the aircraft tray table may need to support a large personal electronic device (e.g., such as a tablet), in addition to or instead of a smaller PED (e.g., such as a smartphone), while keeping to a low profile to reduce an amount of required storage and thus maintaining the cabin attendant aircraft seat footprint.

As such, it would be desirable to provide a cabin attendant aircraft tray table. The cabin attendant aircraft tray table should be installable on the cabin attendant aircraft seat when in use. The cabin attendant aircraft tray table should be removable from and stowable within the footprint of the cabin attendant aircraft seat when not in use. The cabin attendant aircraft tray table should be low-profile to reduce an amount of required storage and thus maintain the footprint of the cabin attendant aircraft seat. The cabin attendant aircraft tray table should be multi-functional, being configured to hold a variety of sizes of PEDs.

It is noted herein the cabin attendant aircraft tray table may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Figure 1B:
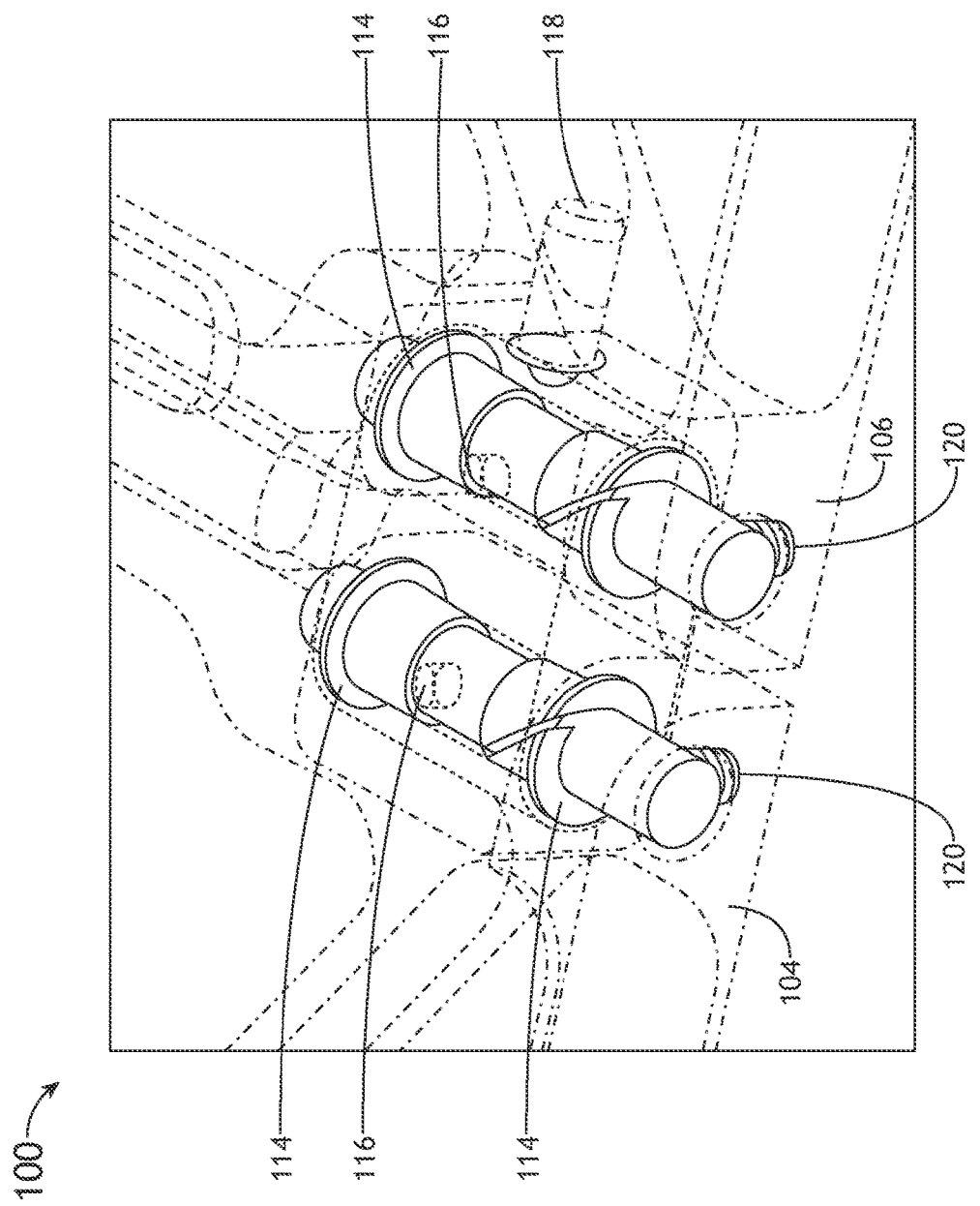
FIG. 1B illustrates a perspective view of a portion of a cabin attendant aircraft tray table, in accordance with one or more embodiments of the disclosure, in accordance with one or more embodiments of the disclosure.
Figure 1C:
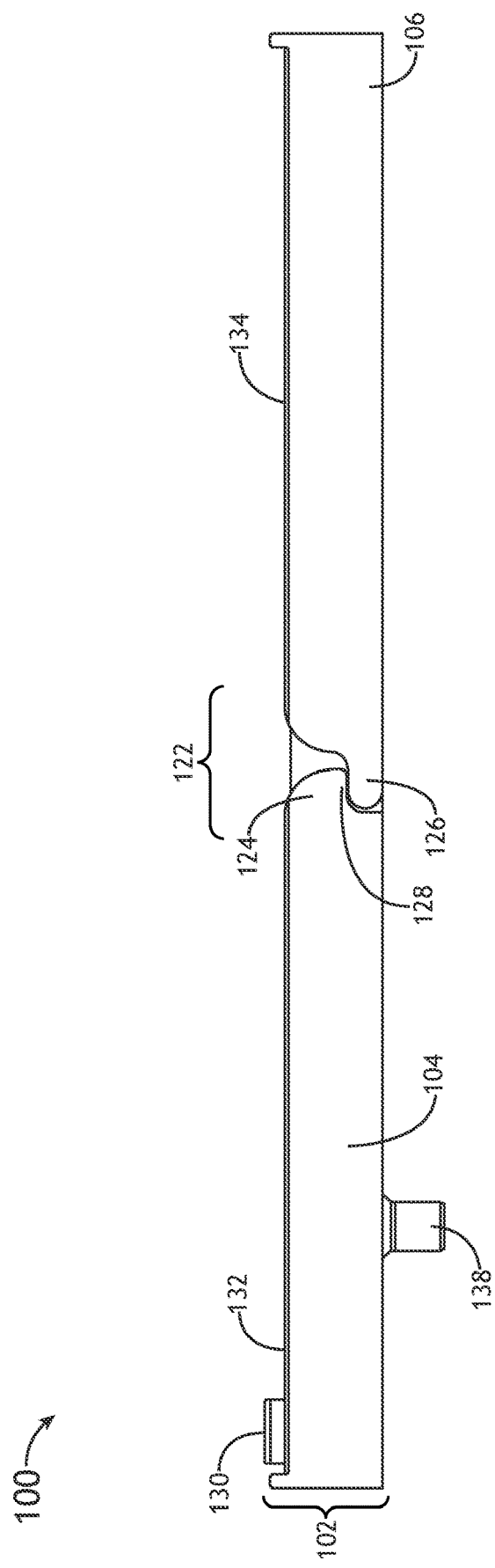
FIG. 1C illustrates an elevation view of a cross-section of a cabin attendant aircraft tray table, in accordance with one or more embodiments of the disclosure, in accordance with one or more embodiments of the disclosure.

FIGS. 1A-1C in general illustrate a cabin attendant aircraft tray table 100, in accordance with one or more embodiments of the disclosure. It is noted herein "cabin attendant aircraft tray table 100" and variants of the term including, but not limited to, "aircraft tray table 100" or "tray table 100" may be considered equivalent, for purposes of the disclosure.

The tray table 100 may include a body 102. The body 102 may include one or more sections. For example, the body 102 may include a rear section 104 and a front section 106. By way of another example, the body 102 may include three or more sections. Where there are multiple sections, the multiple sections may be equal in length or may be different in length depending on the storage location within a seat footprint of a cabin attendant aircraft seat on which the tray table 100 may be installed. It is noted herein, however, the body 102 may include a single section (e.g., be a single continuous piece), as long as the seat footprint of the cabin attendant aircraft seat is maintained.

The rear section 104 and the front section 106 (or adjacent sections of the multiple sections, in general) may be coupled together by one or more hinges 108. For example, the one or more hinges 108 may include a double-action hinge or a single-action hinge.

The one or more hinges 108 may include a hinge body 110 and one or more shafts. For example, the tray table 100 may include two hinges 108, with each hinge coupled to the rear section 104 via a first shaft 112a and coupled to the front section 106 via a second shaft 112b.

The one or more hinges 108 may include one or more bearings 114 along each shaft 112a,b. For example, a hinge 108 may include two bearings 114 along each shaft 112a,b. The hinge body 110 may include one or more notches 116, and one or more sections of the body 102 may include one or more inset ball detents 118 configured to engage with the one or more notches 116. For example, an exterior surface of the hinge body 110 may include a notch 116 and the front section 106 may include an inset ball detent 118 configured to engage with the notch 116. By way of another example, an exterior surface of the hinge body 110 may include a notch 116 and the rear section 104 may include an inset ball detent 118 configured to engage with the notch 116. By way of another example, the body 102 may include a combination of front and rear inset ball detents 118, and the exterior surface of the hinge body 110 may include corresponding notches 116.

It is noted herein the body 102 is not limited to ball detents 118 and corresponding notches 116 on the hinge body 110, but rather may use any mechanical coupling or interlocking assembly known in the art and configured to hold the front section 106 of the body 102 at an angle relative to a hinge body 110 and/or the rear section 104 of the body 102.

It is noted herein the one or more hinges 108 may be a torque hinge configured to hold itself in place, such that the ball detents 118 and corresponding notches 116 on the hinge body 110 and/or other mechanical coupling or interlocking assembly known in the art may not be required to hold the front section 106 of the body 102 at an angle relative to a hinge body 110 and/or the rear section 104 of the body 102.

One or more fasteners 120 may be used to couple the one or more hinges 108 to the body 102. For example, each hinge 108 may be held in place within a section of the body 102 by one or more set screws, where the one or more set screws are configured to engage with a shaft 112a,b or an exterior surface of the hinge body 110. It is noted herein the one of more hinges 108 may installed with an adhesive, an interlocking assembly, an interference fit, or the like at least partially within a section of the body 102.

The aircraft tray table 100 may include one or more interlocking assemblies 122 configured to prevent the front section 106 from over-actuation about the one or more hinges 108. For example, the one or more interlocking assemblies 122 may include a first component 124 and a second component 126, where the first component 124 and the second component 126 each include surfaces 128 configured to come into contact when the aircraft tray table is in a deployed position. For instance, the first component 124 may be a protrusion from an exterior surface of the front section 106, and the second component 126 may be a recess within an exterior surface of the rear section 104. The one or more interlocking assemblies 122 may extend across a portion of a width of the body 102. For example, the one or more interlocking assemblies 122 may be positioned between multiple hinges 108. It is noted herein, however, the one or more interlocking assemblies 122 may extend across the full width of the body 102, where interference with the one or more hinges 108 would not occur.

The aircraft tray table 100 may include one or more bumpers 130. For example, the one or more bumpers 130 may be coupled to a rear upper surface 132 of the rear section 104, or pass in the rear upper surface 132 (e.g., are inset within grooves in the rear section 104). The one or more bumpers 130 may support the front section 106 when folded onto the rear section 104. For example, a front upper surface 134 may be in contact with the one or more bumpers 130 when the front section 106 is folded onto the rear section 104.

It is noted herein one or more bumpers 130 may be coupled to the front upper surface 134 of the front section 106, or pass through the front upper surface 134 (e.g., are inset within grooves in the front section 106), instead of or in addition to the one or more bumpers 130 may coupled to or passing through the rear upper surface 132.

The body 102 may include one or more fins 136. For example, the one or more fins 136 may be located along a periphery of the rear section 104. For instance, the rear section 104 may include two fins spaced on opposite sides of the rear section 104. The one or more fins 136 may include one or more fittings 138 configured to engage with an aircraft cabin flight attendant seat.

FIGS. 2A-2E in general illustrate the cabin attendant aircraft tray table 100 in various positions, in accordance with one or more embodiments of the disclosure.

In general, the hinge body 110 may be set at an angle 200 relative to the rear section 104 in the various positions, and the front section 106 may be set at an angle 202 relative to the hinge body 110 in the various positions. It is noted herein the angles 200, 202 may change during actuation of the front section 106 between a stowed position and one or more deployed positions.

Figure 2A:
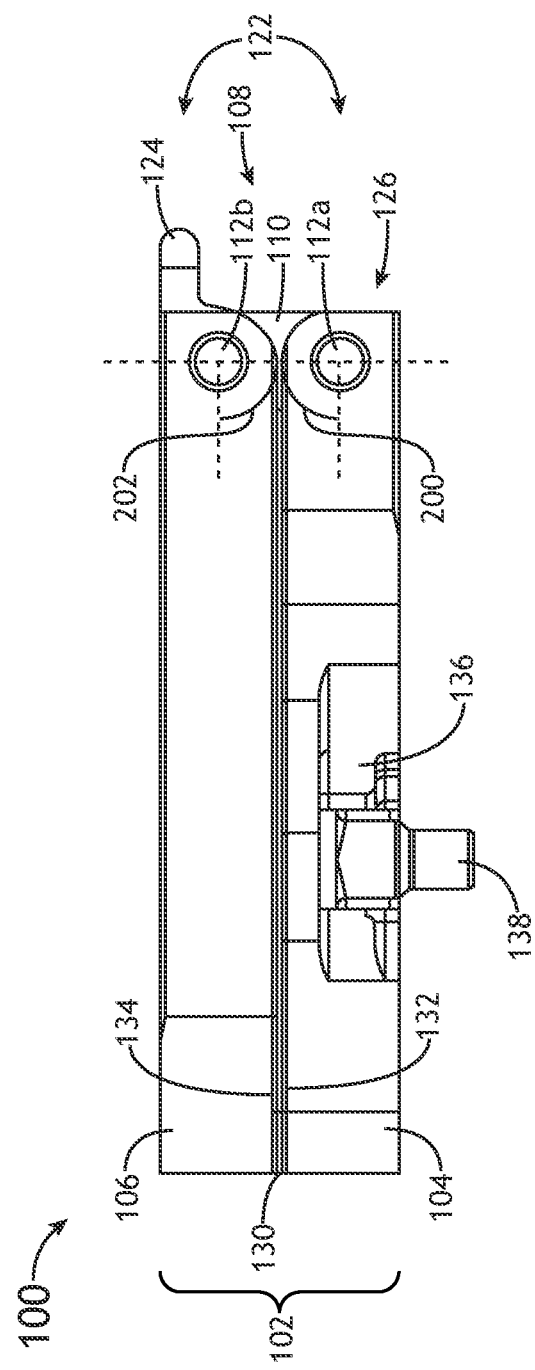
FIG. 2A illustrates an elevation view of a cabin attendant aircraft tray table, in accordance with one or more embodiments of the disclosure, in accordance with one or more embodiments of the disclosure.

Referring now to FIG. 2A, the front section 106 is in the stowed position. In the stowed position, the front section 106 is folded on top of the rear section 104 via the one or more hinges 108. The hinge body 110 may be set at an angle 200 of 90-degrees (or substantially 90 degrees) relative to the rear section 104. The front section 106 may be set at an angle 202 of 90 degrees (or substantially 90 degrees) relative to the hinge body 110. The stowed position of the tray table 100 may be a low profile suitable for stowing of the tray table 100, without increasing the seat footprint of the cabin attendant aircraft seat. The upper surface 132 of the rear section 104 and the upper surface 134 of the front section 106 may be proximate and in separate planes. For example, the separate planes may be parallel (or substantially parallel).

Figure 2B:
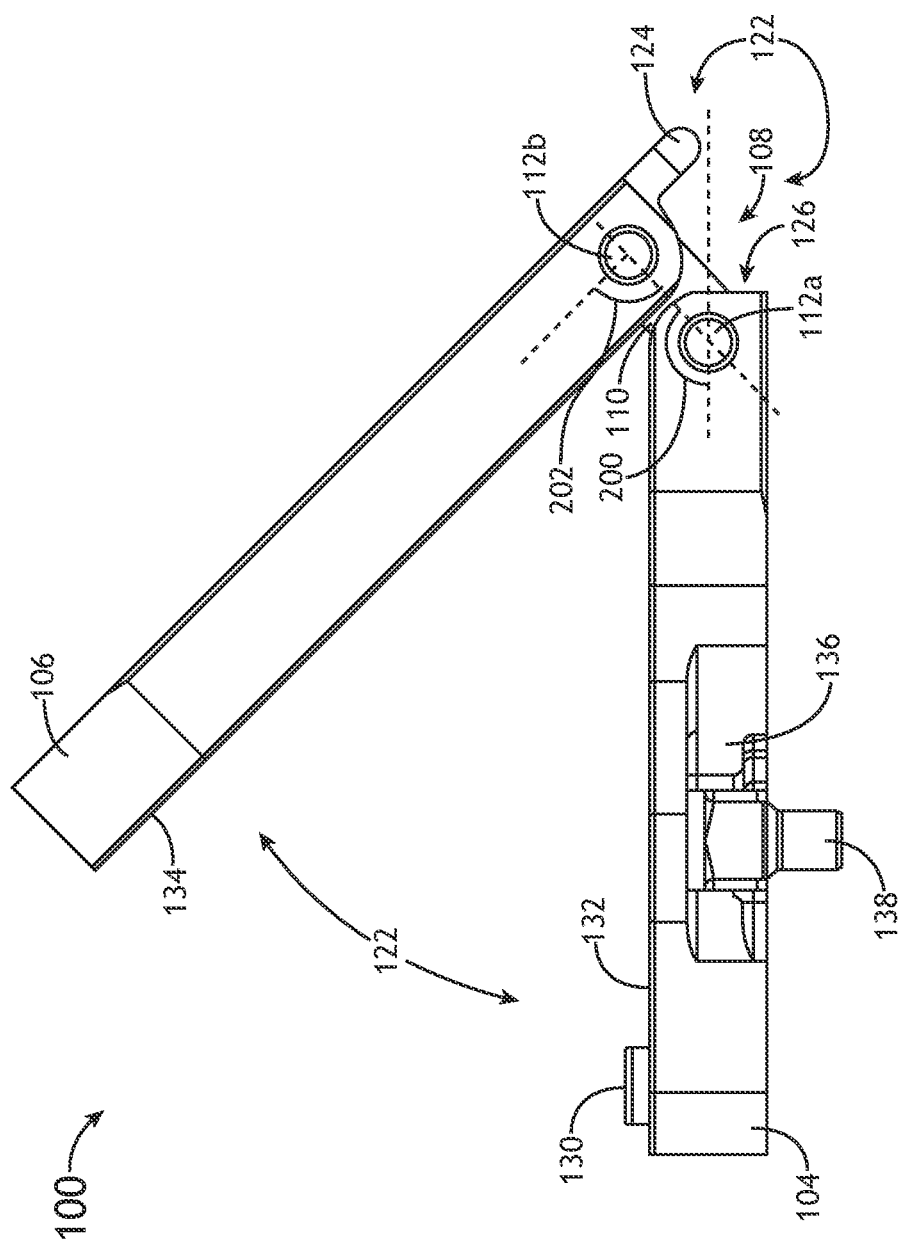
FIG. 2B illustrates an elevation view of a cabin attendant aircraft tray table, in accordance with one or more embodiments of the disclosure, in accordance with one or more embodiments of the disclosure.

Referring now to FIG. 2B, the front section 106 is in a first intermediate position between the stowed position and a first deployed position or PED position. In the first intermediate position, the front section 106 is partially open relative to the rear section 104 via the one or more hinges 108. The hinge body 110 may be at an angle 200 between 90 and 180 degrees relative to the rear section 104. The front section 106 may remain set at an angle 202 of 90 degrees (or substantially 90 degrees) relative to the hinge body 110. In this regard, the hinge body 110 will actuate about a first shaft 112a in the rear section 104 prior to actuating about a second shaft 112b in the front section 106.

It is noted herein FIG. 2B represents one example intermediate position, and that any number of intermediate positions may exist between the stowed position and the PED position. Therefore, the above description should not be interpreted as a limitation on the present disclosure but merely an illustration.

Referring now to FIG. 2C, the front section 106 is in the PED position. In the PED position, the front section 106 is perpendicular (or substantially perpendicular) to the rear section 104 (and the upper surface 134 of the front section 106 is perpendicular (or substantially perpendicular) to the upper surface 132 of the rear section 104). The hinge body 110 may be set at an angle 200 of 180 degrees (or substantially 180 degrees) relative to the rear section 104. The front section 106 may be set at an angle 202 of 90 degrees (or substantially 90 degrees) relative to the hinge body 110. The PED position of the tray table 100 may be suitable for holding a PED in place for the cabin attendant via a mechanical assembly. For example, the mechanical assembly may include a ball detent 118 (or other interlocking assembly configured to engage with the hinge 108) capable of locking the vertical (or substantially vertically) front section 106 (e.g., providing a return force to counter the weight of the PED pressing on the vertical (or substantially vertical) front section 106), such that the vertical (or substantially vertical) front section 106 may remain perpendicular (or substantially perpendicular) to the rear section 104.

As illustrated in the transition between FIGS. 2A-2C, a sub-assembly including the front section 106 and the hinge body 110 may be configured to actuate about the first shaft 112a in the rear section 104, causing the angle 200 to change between the hinge body 110 and the rear section 104, while the front section 106 and the hinge body 110 maintains a set angle 202.

It is noted herein, however, the front section 106 may be configured to actuate about the second shaft 112b in the front section 106 while transitioning between the stowed position and the PED position. For example, a sub-assembly including the rear section 104 and the hinge body 110 may maintain a set angle 200, while the front section 106 may be configured to actuate about the second shaft 112b within the front section 106, causing the angle 202 to change between the hinge body 110 and the front section 106. By way of another example, the angles 200, 202 may both change as the front section 106 actuates from the stowed position to the PED position.

Figure 2D:
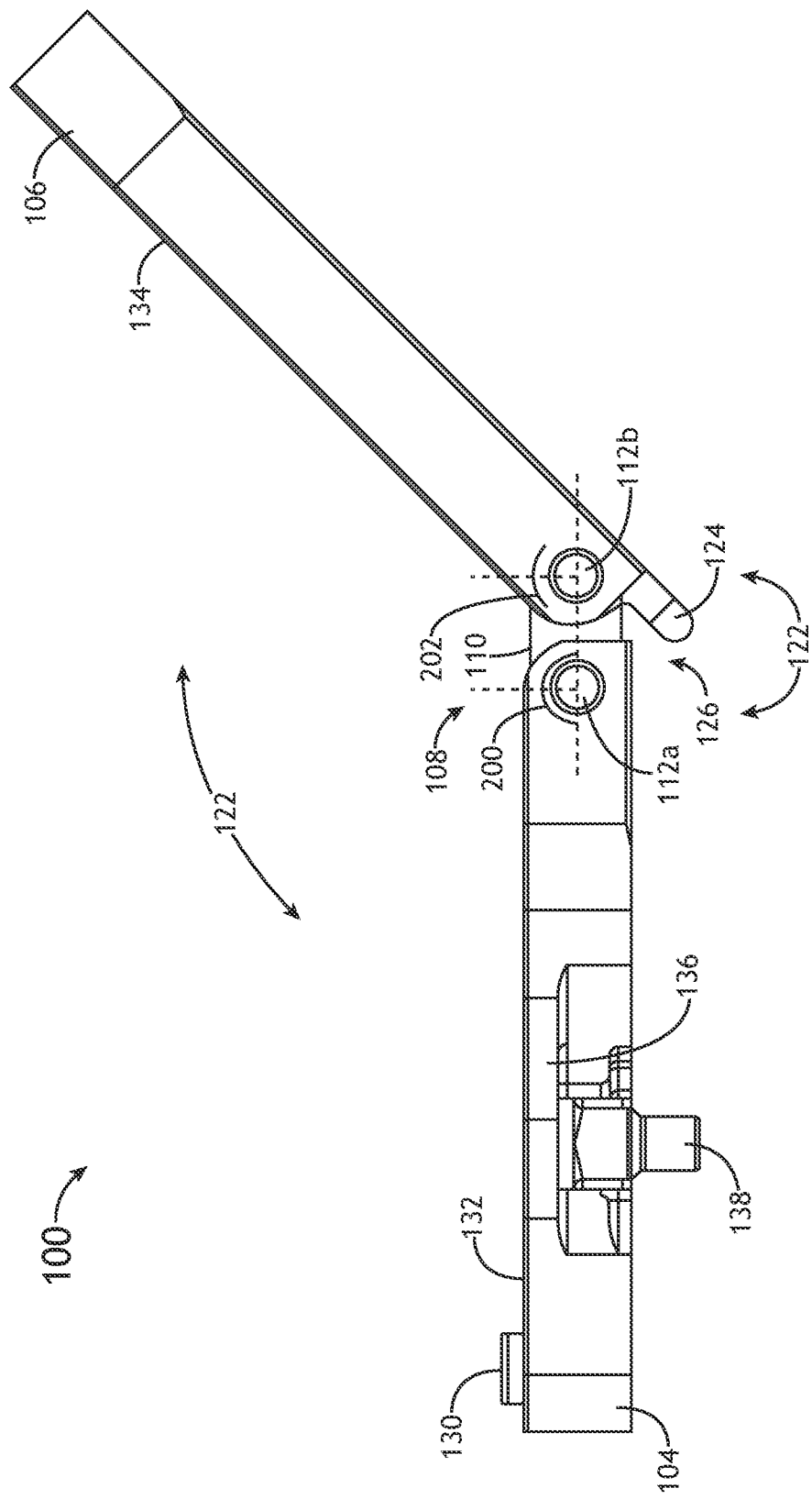
FIG. 2D illustrates an elevation view of a cabin attendant aircraft tray table, in accordance with one or more embodiments of the disclosure, in accordance with one or more embodiments of the disclosure.

Referring now to FIG. 2D, the front section 106 is in a second intermediate position between the PED position and a second deployed position or tray position. In the second intermediate position, the front section 106 is partially open relative to the rear section 104 via the one or more hinges 108. In the second intermediate position, the hinge body 110 may be set at an angle 200 of 180 degrees (or substantially 180 degrees) relative to the rear section 104. The front section 106 may be at an angle 200 between 90 and 180 degrees relative to the hinge body 110. In this regard, the hinge body 110 will actuate about the second shaft 112b in the front section 106 while actuation about the first shaft 112a in the front section 106 is prevented (e.g., by the one or more interlocking assemblies 122).

It is noted herein FIG. 2D represents one example intermediate position, and that any number of intermediate positions may exist between the PED position and the tray position. Therefore, the above description should not be interpreted as a limitation on the present disclosure but merely an illustration.

Figure 2E:
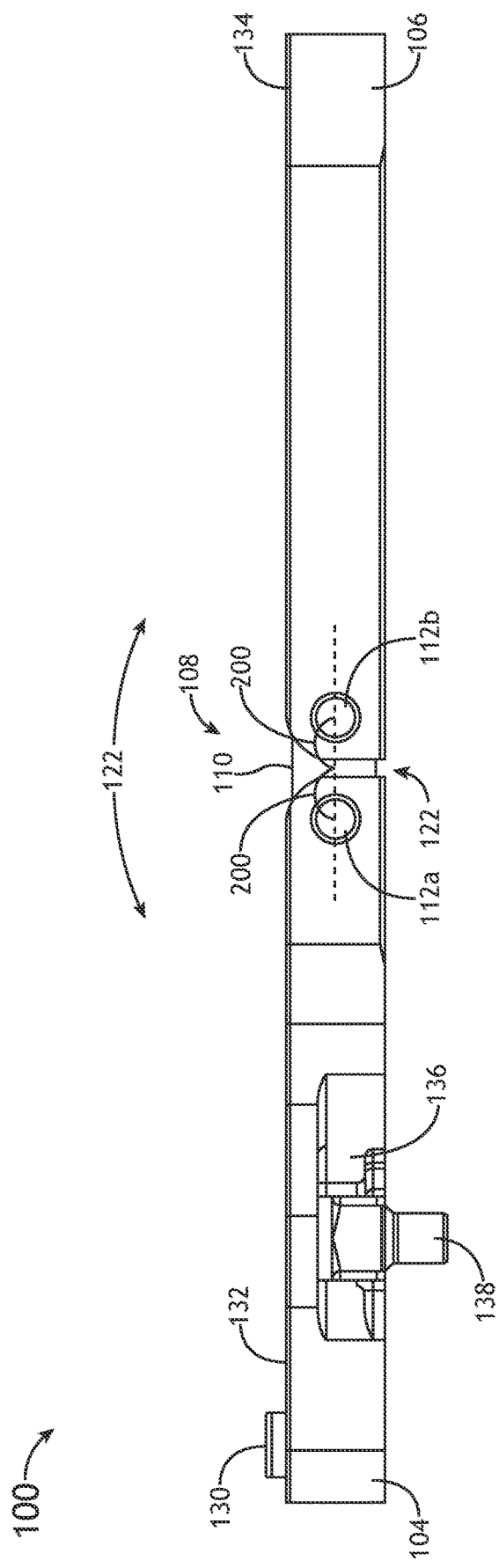
FIG. 2E illustrates an elevation view of a cabin attendant aircraft tray table, in accordance with one or more embodiments of the disclosure, in accordance with one or more embodiments of the disclosure.
Figure 3A:
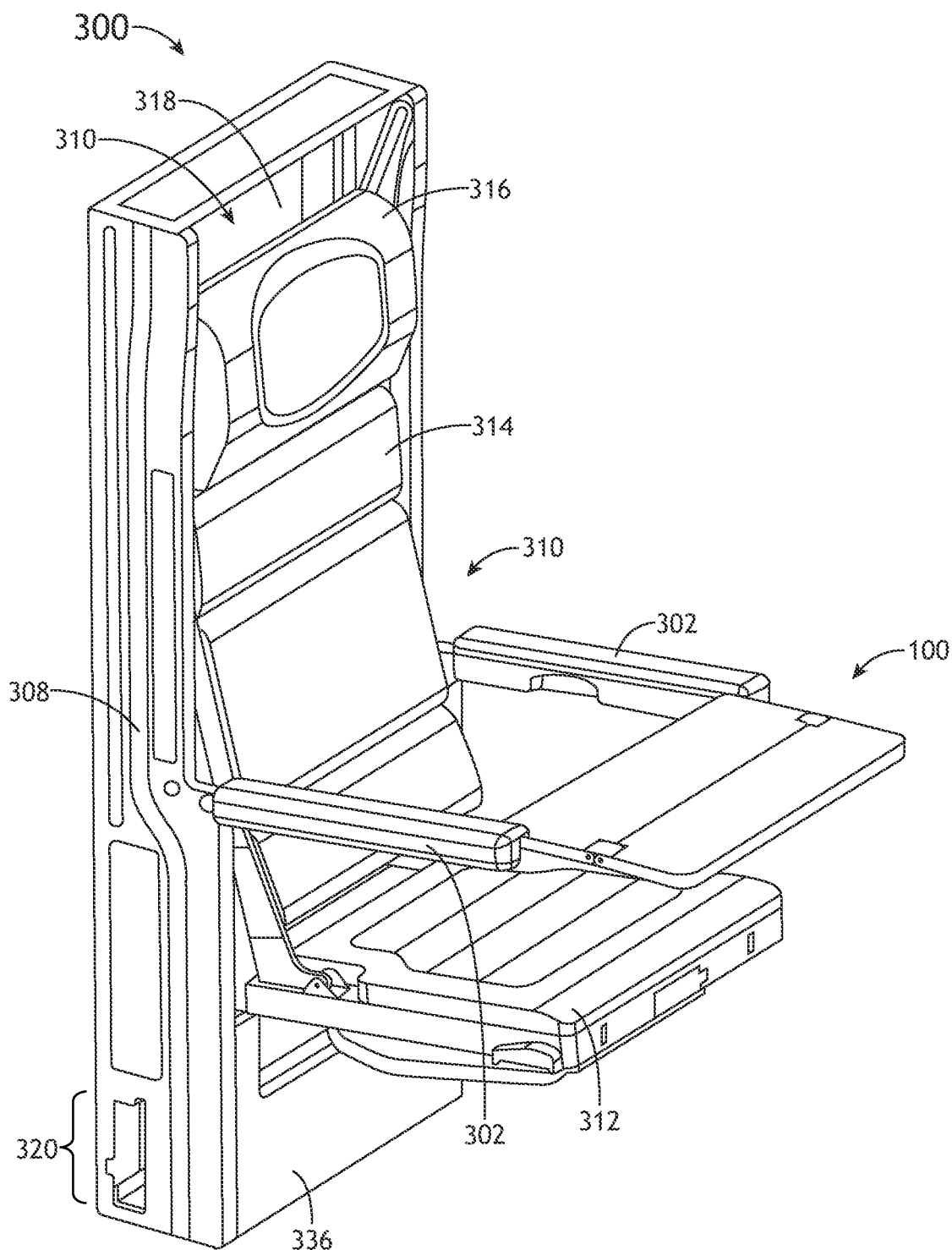
FIG. 3A illustrates a perspective view of a cabin attendant aircraft seat assembly including a cabin attendant aircraft tray table, in accordance with one or more embodiments of the disclosure.
Figure 3B:
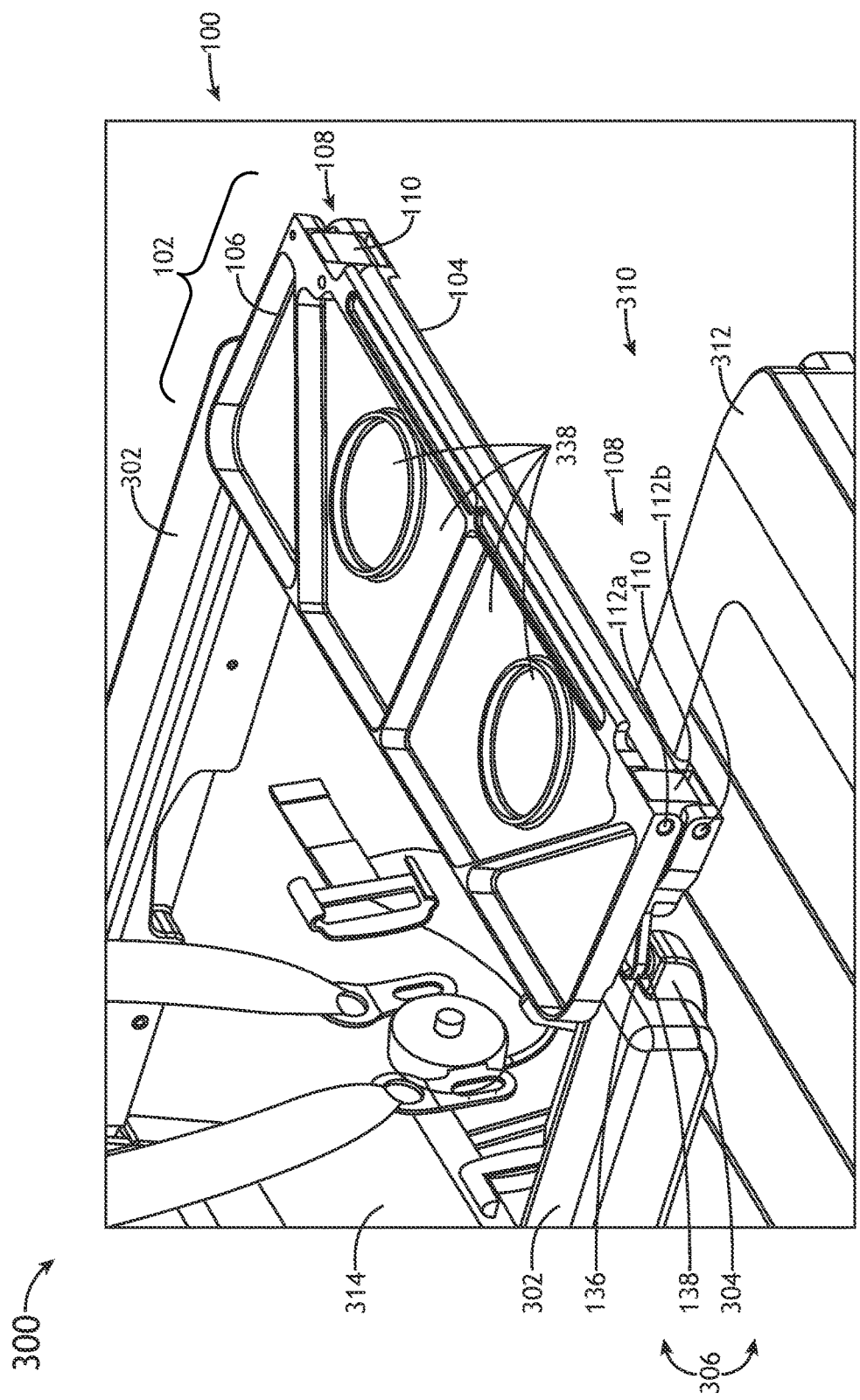
FIG. 3B illustrates a perspective view of a cabin attendant aircraft seat assembly including a cabin attendant aircraft tray table, in accordance with one or more embodiments of the disclosure.
Figure 3C:
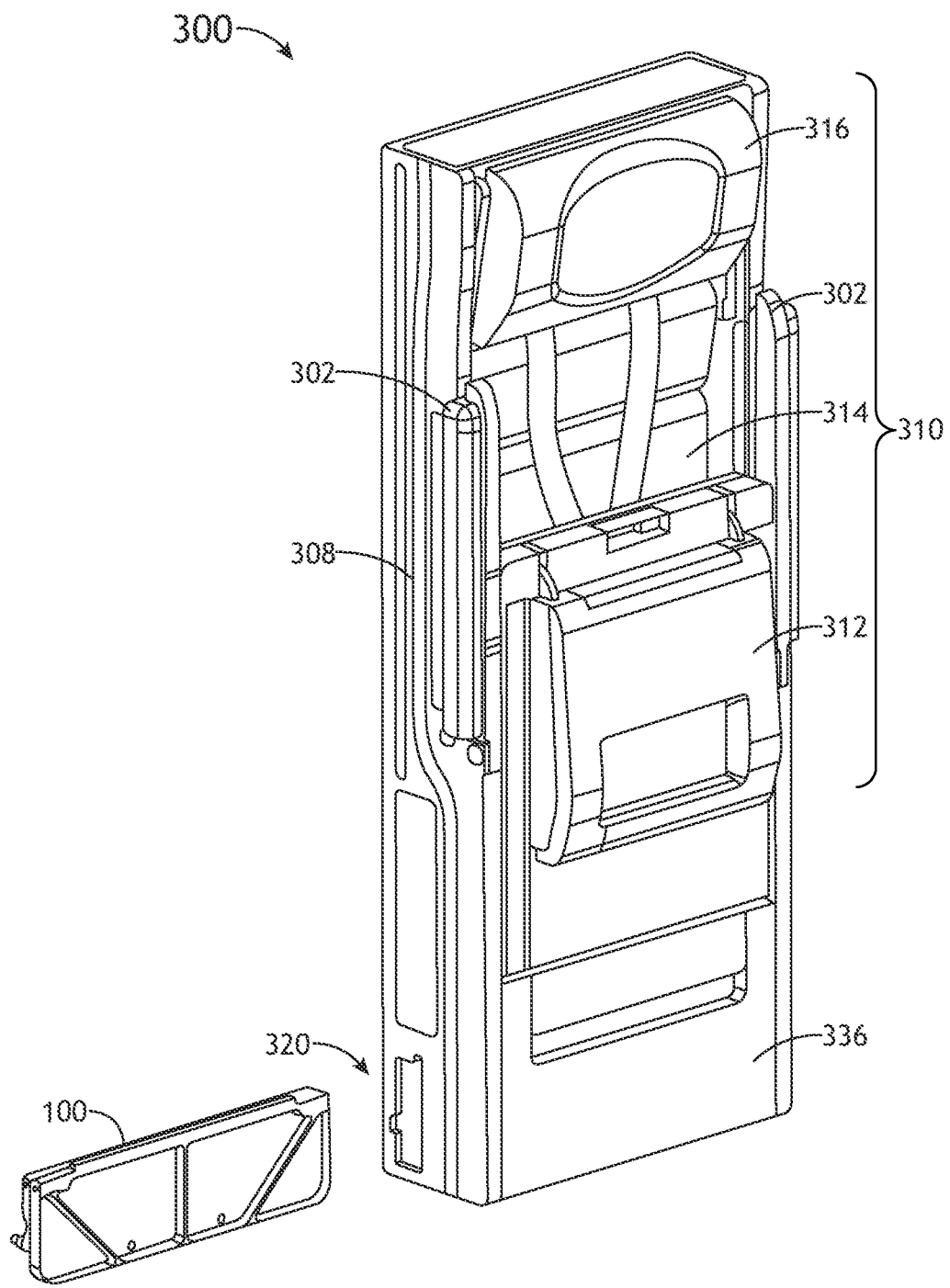
FIG. 3C illustrates a perspective view of a cabin attendant aircraft seat assembly including a cabin attendant aircraft tray table, in accordance with one or more embodiments of the disclosure.
Figure 3D:
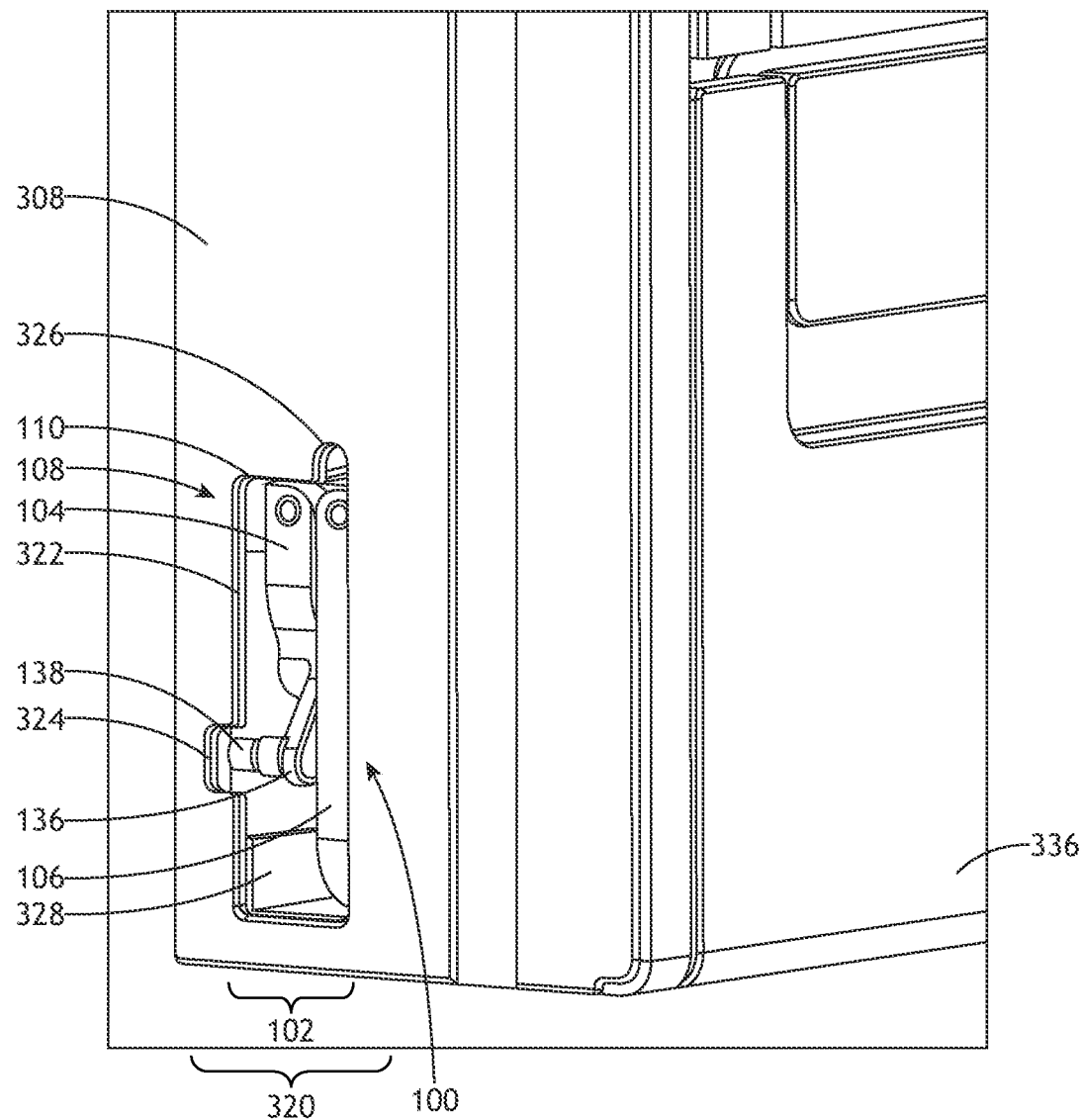
FIG. 3D illustrates a perspective view of portions of a cabin attendant aircraft seat assembly including a cabin attendant aircraft tray table, in accordance with one or more embodiments of the disclosure.
Figure 3E:
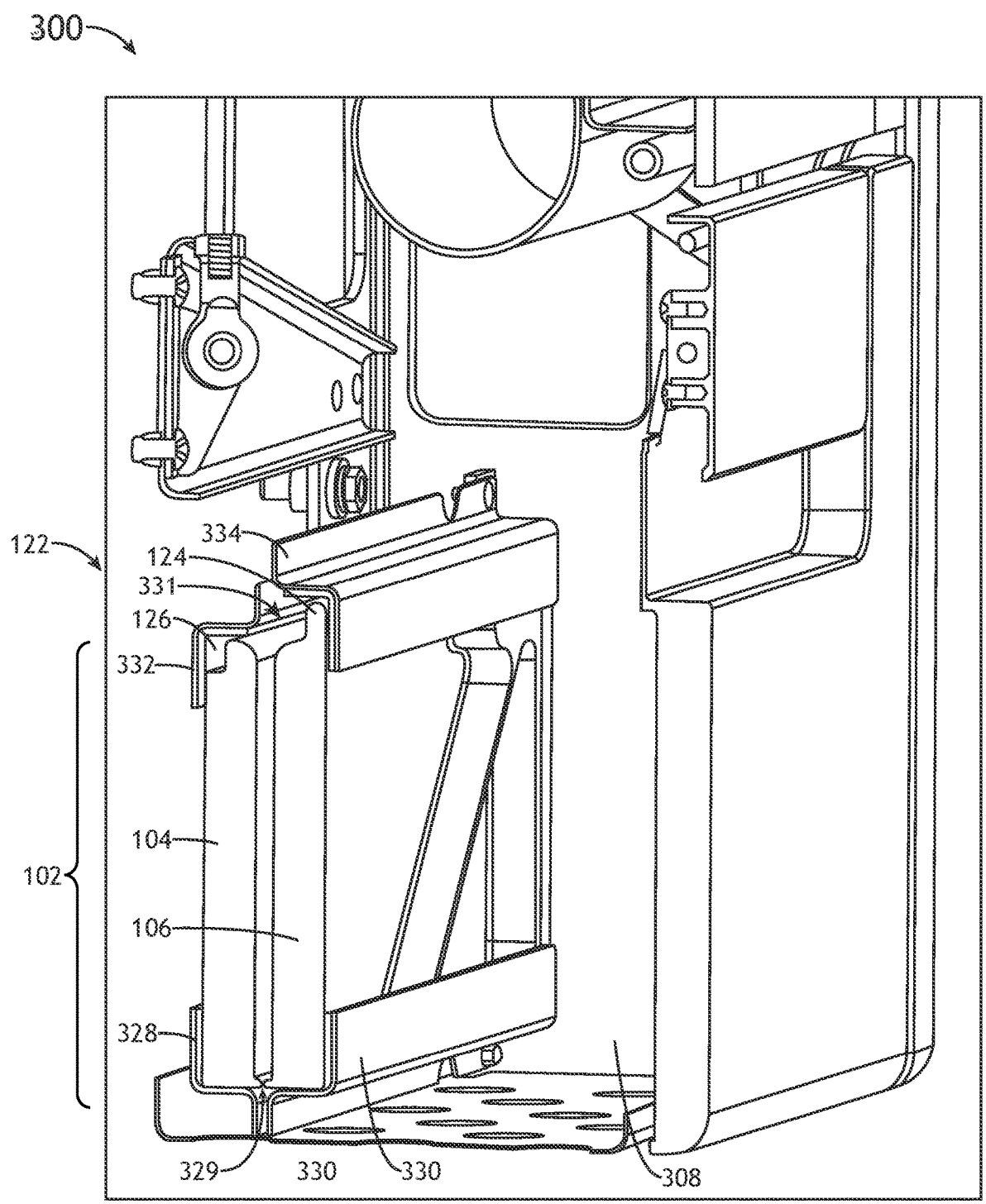
FIG. 3E illustrates a perspective view of a cross-section of portions a cabin attendant aircraft seat assembly including a cabin attendant aircraft tray table, in accordance with one or more embodiments of the disclosure.
Figure 3F:
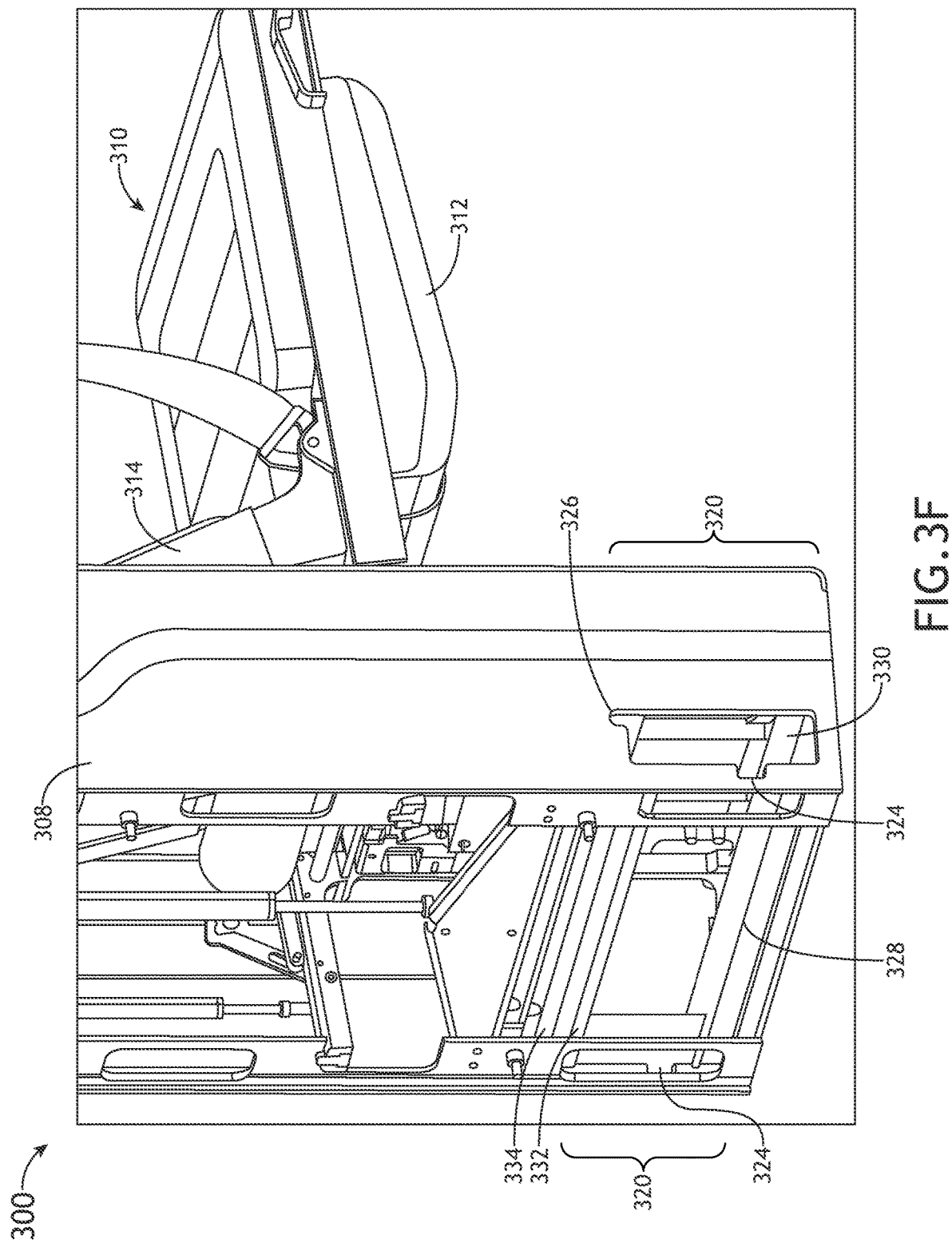
FIG. 3F illustrates a perspective view of portions of a cabin attendant aircraft seat assembly including a cabin attendant aircraft tray table, in accordance with one or more embodiments of the disclosure.
Figure 3G:
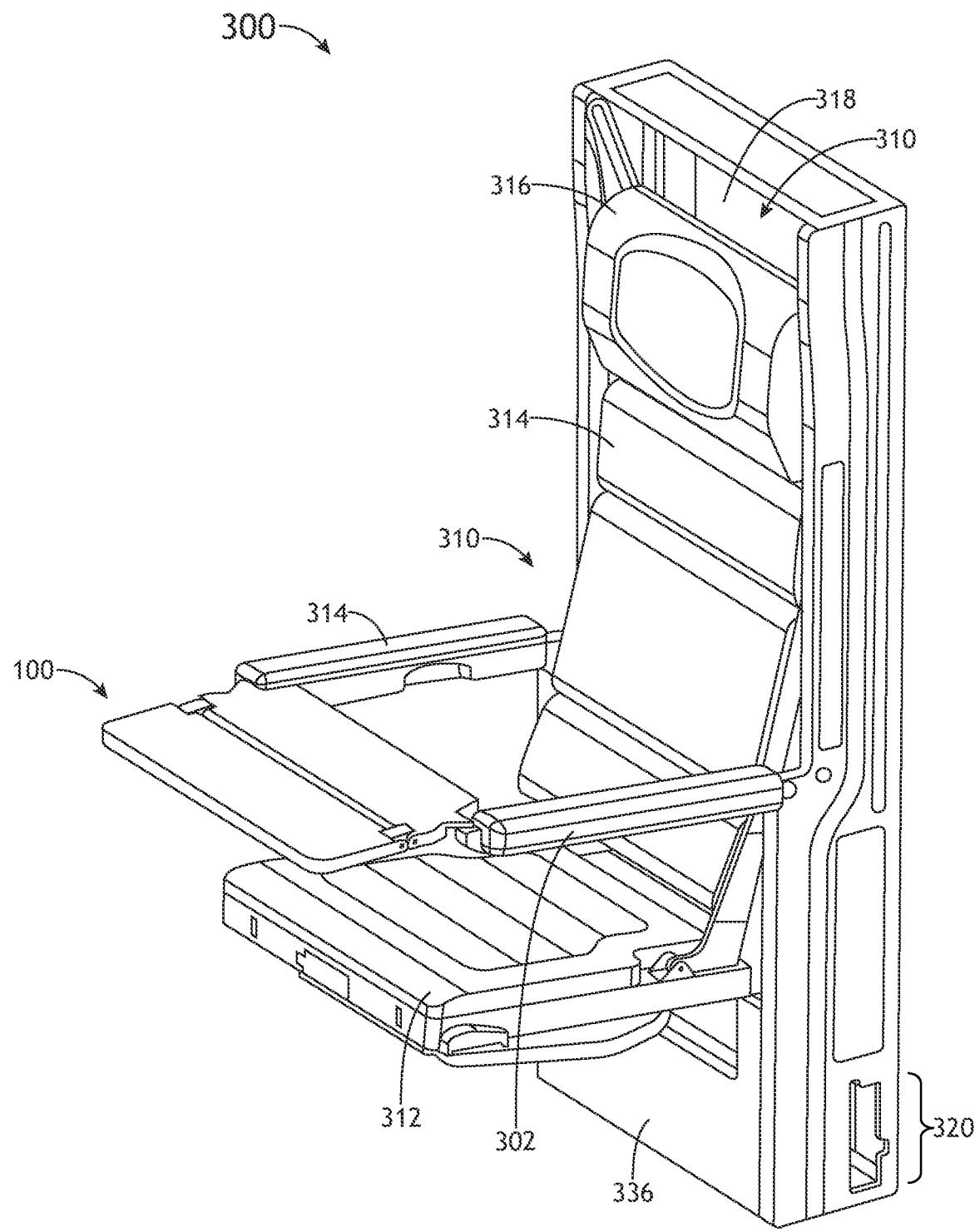
FIG. 3G illustrates a perspective view of a cabin attendant aircraft seat assembly including a cabin attendant aircraft tray table, in accordance with one or more embodiments of the disclosure.
Figure 4A:
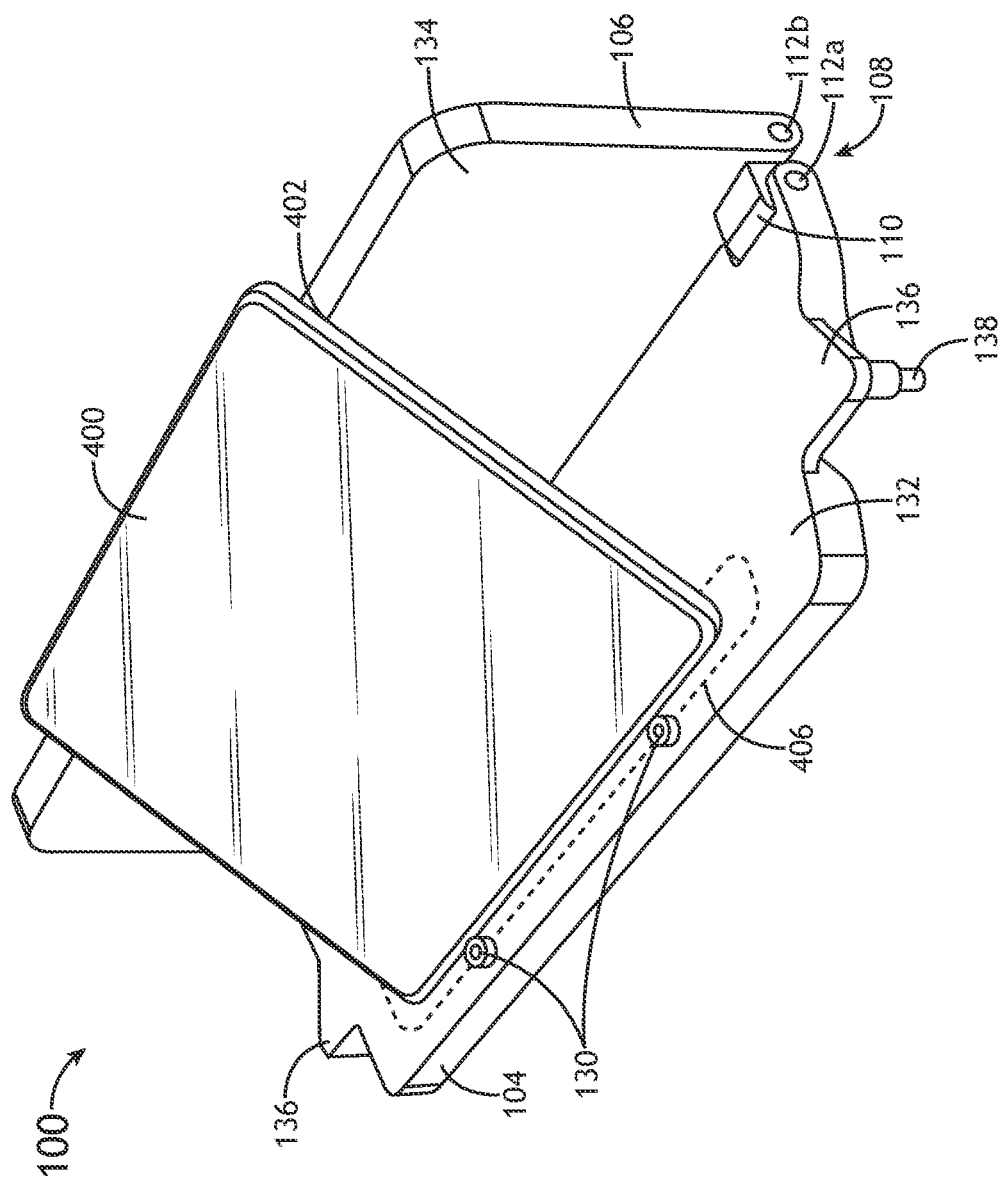
FIG. 4A illustrates a perspective view of a cabin attendant aircraft tray table and a personal electronic device (PED), in accordance with one or more embodiments of the disclosure.
Figure 4B:
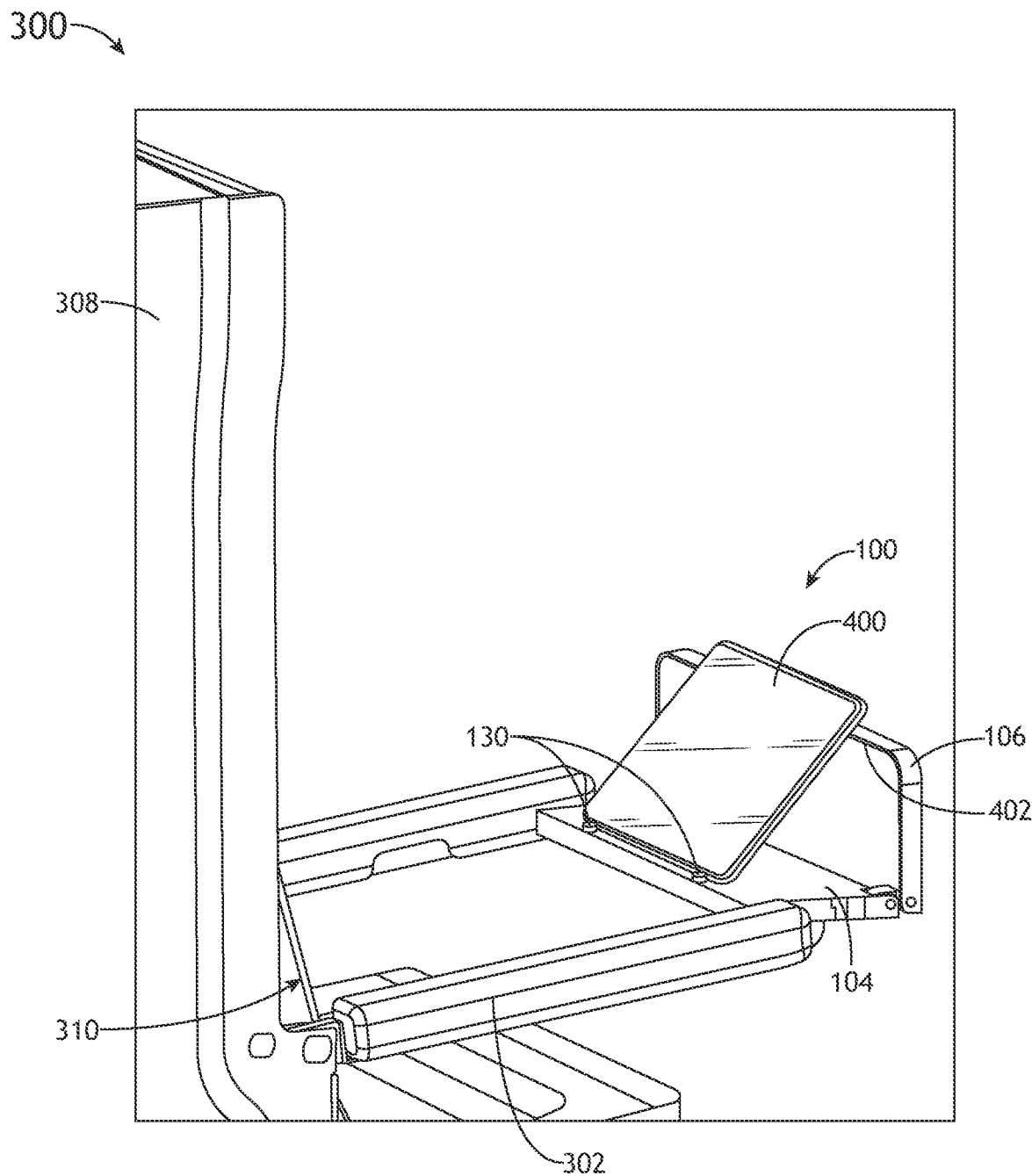
FIG. 4B illustrates a perspective view of a cabin attendant aircraft set assembly, a cabin attendant tray table, and a personal electronic device (PED), in accordance with one or more embodiments of the disclosure.
Figure 4C:
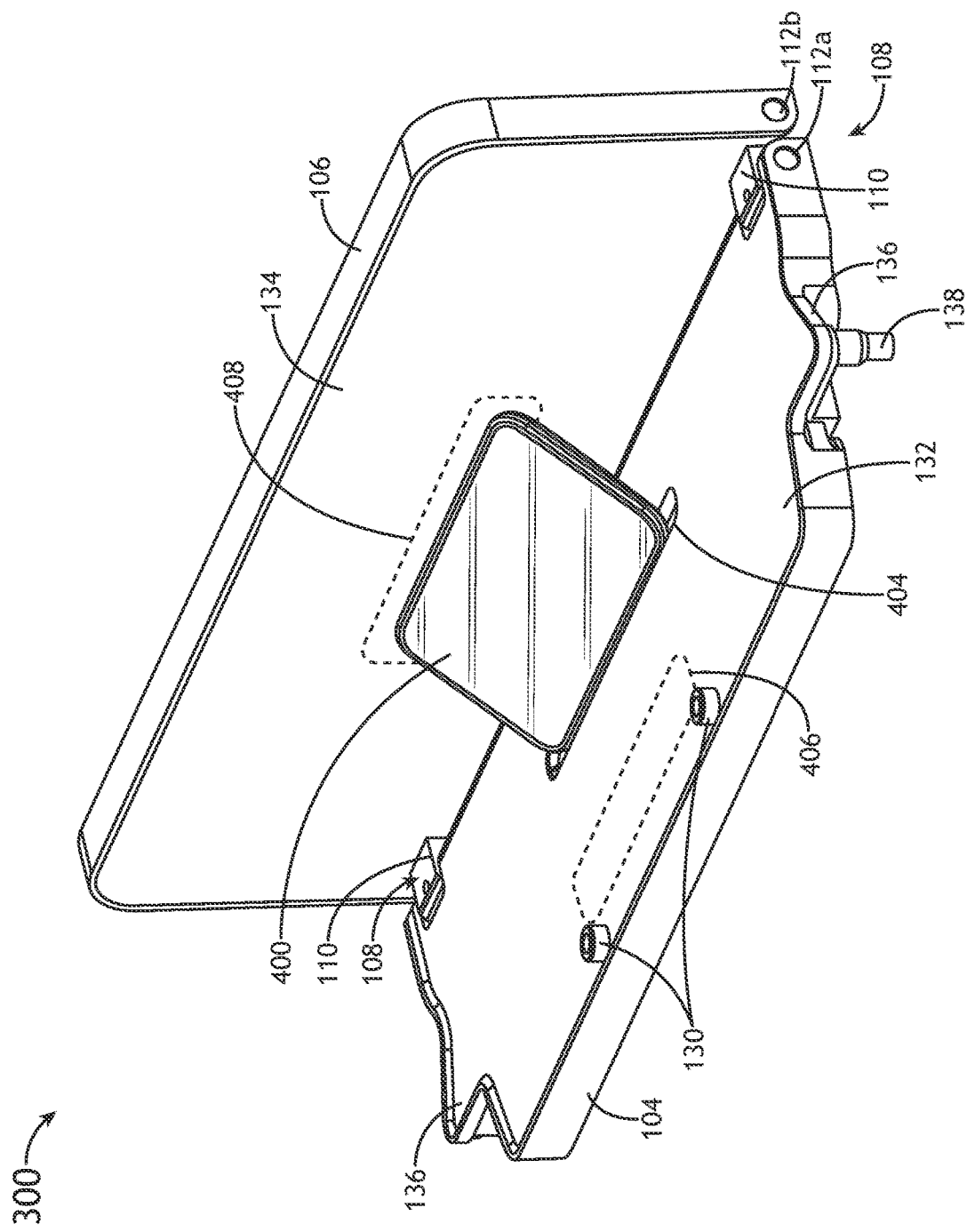
FIG. 4C illustrates a perspective view of a cabin attendant aircraft tray table and a personal electronic device (PED), in accordance with one or more embodiments of the disclosure.

Referring now to FIG. 2E, the front section 106 is in the tray position. In the tray position, the front section 106 is parallel (or substantially parallel) to the rear section 104. The hinge body 110 may be set at an angle 200 of 180 degrees (or substantially 180 degrees) relative to the rear section 104. The front section 106 may be set at an angle 202 of 180 degrees (or substantially 180 degrees) relative to the hinge body 110 (and thus the rear section 104). The tray position of the tray table 100 may be suitable for use by the cabin attendant (e.g., for eating, or the like), as the upper surface 132 of the rear section 104 and the upper surface 134 of the front section 106 (and thus the rear section 104 and the front section 106) are co-planar, forming a single surface when the front section 106 is in the tray position.

As illustrated in the transition between FIGS. 2C-2E, the front section 106 is configured to actuate relative to the hinge body 110 about the second shaft 112b within the front section 106, while the rear section 104 and the hinge body 110 maintains a set angle 200. The surface 128 of the first component 124 of the one or more interlocking assemblies 122 may engage the surface 128 of the second component 126 of the one or more interlocking assemblies 122 as the front section 106 enters the tray position. An engaging by the surface 128 of the first component of the second surface 128 of the second component 126 preventing the front section 106 from over-actuating beyond co-planar.

It is noted herein, however, the rear section 104 may be configured to actuate about the first shaft 112a in the rear section 104 while transitioning between the PED position and the tray position. For example, a sub-assembly including the front section 106 and the hinge body 110 may maintain a set angle 202, while the rear section 104 may be configured to actuate about the first shaft 112a within the rear section 104, causing the angle 200 to change between the hinge body 110 and the rear section 104. By way of another example, the angles 200, 202 may both change as the front section 106 actuates from the PED position to the tray position.

It is noted herein the particular angles 200, 202 as listed above are only examples, and that the angles 200, 202 may be any angle between 0 and 180 degrees.

It is noted herein the actuation of the front section 106 from the tray position to the stowed position may involve performing all or a portion of the above steps in a different order. For example, the front section 106 may rotate relative to the hinge body 110 about the second shaft 112b in the front section 106 from the tray position to the PED position, and then the front section 106 and the hinge body 110 may rotate relative to the rear section 104 about the first shaft 112a in the rear section 104 from the PED position to the stowed position.

FIGS. 3A-3G in general illustrate a cabin attendant aircraft seat assembly 300, in accordance with one or more embodiments of the disclosure. It is noted herein "cabin attendant aircraft seat assembly 300" and variants of the term including, but not limited to, "aircraft seat assembly 300" or "seat assembly 300" may be considered equivalent, for purposes of the disclosure.

The seat assembly 300 may include one or more armrests 302. The one or more armrests 302 may be actuatable between a stowed position and a deployed position.

The one or more fittings 138 of the aircraft tray table 100 may be couplable to the one or more armrests 302 via one or more receivers 304. For example, the one or more receivers 304 may be counter-bored into the one or more armrests 302. By way of another example, the one or more receivers 304 may be counter-bored within components attached to the one or more armrests 302. For instance, the components attached to the one or more armrests 302 may be static or actuatable (e.g., configured to stow within the one or more armrests 302). It is noted herein the one or more fittings 138 and the one or more receivers 304 may be considered components of an interlocking assembly 306.

It is noted herein the one or more receivers 304 may be dimensioned and toleranced such that the depth of the one or more receivers 304 and the diameter (or diameters) within the one or more receivers 304 is sufficient to hold onto the one or more fittings 138 of the aircraft tray table 100 and prevent front-loading from uncoupling the aircraft tray table from the one or more armrests 302. In addition, it is noted herein the one or more receivers 304 may be coated with a material configured to increase friction between the one or more receivers 304 and the one or more fittings 138. Further, it is noted herein the one or more fittings 138 and/or the one or more receivers 304 may include one or more gaskets or seals configured to increase friction between the one or more receivers 304 and the one or more fittings 138.

The seat assembly 300 may include a frame 308. The frame 308 may be couplable to an interior structure in an aircraft cabin. The frame 308 may be couplable to a floor in the aircraft cabin.

A cabin attendant aircraft seat 310 may be coupled to the frame 308. It is noted herein "cabin attendant aircraft seat 310" and variants of the term including, but not limited to, "aircraft seat 310" or "seat 310" may be considered equivalent, for purposes of the disclosure.

The aircraft seat 310 may be a single-occupant seat or a double-occupant seat. The aircraft seat 310 may include a seat pan and cushion 312, a seat back and cushion 314, and a head rest 316. At least a portion of the aircraft seat 310 may fit within a cavity 318 of the frame 308. For example, the seat back and cushion 314 and a portion of the seat pan and cushion 312 may fit within the cavity 318 of the frame 308. It is noted herein, however, additional portions or the entire aircraft seat 310 may fit within the cavity 318 in the frame 308.

The aircraft seat 310 may be rotatable about an axis (e.g., swivelable) or translatable (e.g., trackable or slidable). The aircraft seat 310 may be rotatable about an axis cross-wise in the aircraft seat 310 into a position including, but not limited to, a stowed position or one or more deployed positions. The aircraft seat 310 may be fully positionable between the outer limits of motion as defined by the moveable components of the aircraft seat 310. Where the aircraft seat 310 is installed within an aisle, a walkway, a galley, and/or an entrance to/egress from the aircraft, the aircraft seat 310 may be fully positionable between the outer limits of motion as defined by surrounding interior structures within the aisle, the walkway, the galley, and/or the entrance to/egress from the aircraft. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 310 may be actuatable (e.g., translatable and/or rotatable) from the TTOL position to a non-TTOL position, and/or vice versa. Further, it is noted herein the aircraft seat 310 may be capable of a fully upright or raised position, and that the TTOL position may have a more reclined seat back cushion and a more angled upward seat pan cushion as compared to the fully upright or raised position. Therefore, the above description should not be interpreted as a limitation on the present disclosure but merely an illustration.

The frame 308 may include a cavity 320. When uncoupled from the one or more receivers 304 and actuated into the stowed position, the aircraft tray table 100 may be insertable within the cavity 320 for storage when not in use.

The cavity 320 may be accessible via one or more cut-outs 322. For example, the frame 308 may include one or more two cut-outs 322 on one or both long sidewalls of the frame 308 to allow for the aircraft seat assembly 300 to be installed on either side of the aircraft cabin without blocking access to the cavity 320. By way of another example, the frame 308 may include a cut-out on a forward surface of the frame 308.

The one or more cut-outs 322 may include a perimeter shaped to the aircraft tray table 100 when in the stowed position. For example, the one or more cut-outs 322 may include a projection 324 for the fitting 138. By way of another example, the one or more cut-outs 322 may include a projection 326 for the first component 124 of the interlocking assembly 122 on the front section 106. It is noted herein, however, the one or more cut-outs 322 may include a perimeter not shaped to the aircraft tray table 100, but instead a shaped as a rectangle or other polygon.

The cavity 320 may include a set of rails configured to guide and retain the aircraft tray table 100 when inserted into the frame 308 for storage.

For example, the cavity 320 may include a rail 328 and a rail 330 forming a first channel configured to receive a first portion 329 of the aircraft tray table 100. For instance, the rail 328 and the rail 330 may be configured to receive the front side of the front section 106 and the rear side of the rear section 104, which are adjacent when the aircraft tray table 100 is in the stowed position. It is noted herein the surfaces of the rail 328 and the rail 330 configured to receive the first portion of the aircraft tray table 100 may be co-planar. In addition, it is noted herein the rail 328 and the rail 330 may be fabricated as separate components or a single component.

By way of another example, the cavity 320 may include a rail 332 and a rail 334 forming a second channel configured to receive a second portion 331 of the aircraft tray table 100. For instance, the rail 332 and the rail 334 may be configured to receive the rear side of the front section 106 and the front side of the rear section 104, which include the components 124, 126 of the interlocking assembly 122. It is noted herein the surfaces of the rail 332 and the rail 334 configured to receive the second portion of the aircraft tray table 100 may be in different planes, due to the difference in height of the second portion of the aircraft tray table 100 caused by the first component 124 of the interlocking assembly 122 on the front section 106. In addition, it is noted herein the rail 332 and the rail 334 may be fabricated as separate components or a single component.

The frame 308 may include a storage compartment 336. For example, the storage compartment 336 may be positioned under the aircraft seat 310/cavity 318 and in front of the cavity 320 for the aircraft tray table 100.

The one or more storage compartment 336 may be configured to receive and hold medical supplies, medical devices, medical tools, or the like. The one or more storage compartments 336 may include one or more safety devices (e.g., air masks, personal floatation devices, or the like).

The one or more storage compartments 336 may include a storage compartment configured to receive luggage or other belongings of the cabin attendant.

The one or more storage compartments 336 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, bassinets, blankets, or the like.

The one or more storage compartments 336 may include one or more electronic connections for one or more passenger amenities such as, but not limited to, one or more charging ports, one or more charging cables, or the like.

The one or more storage compartments 336 may include one or more electronic connections in communication with one or more components of the suite such as, but not limited to, one or more display device connection ports, one or more display device connection cables, one or more audio output jacks (e.g., headphone jacks), one or more audio input jacks, or the like.

The aircraft tray table 100 may include one or more grooves and recesses 338. The one or more grooves or recesses 338 may be accessible when the front section 106 is in the stowed position and the aircraft tray table 100 is coupled to the aircraft seat assembly 300 via the one or more interlocking assembly 306. For example, the one or more grooves or recesses 338 may be usable as cupholders or compartments for holding personal belonging of a cabin attendant.

Although embodiments of the disclosure illustrate the aircraft tray table 100 being stowed in a folded configuration within the frame 308, it is noted herein the aircraft tray table 100 may be stowed in a unfolded configuration where the cut-out 322 (e.g., with projections 324, 326) within the frame 308 and the rails 328, 330, 332, 334 within the cavity 320 are configured to receive the aircraft tray table 100 in the unfolded configuration. Therefore, the above description should not be interpreted as a limitation on the present disclosure but merely an illustration.

FIGS. 4A-4D in general illustrate the cabin attendant aircraft tray table 100 and a personal electronic device (PED) 400, in accordance with one or more embodiments of the disclosure.

The PED 400 may include any electronic device known in the art. For example, the PED 400 may be a handheld computer including, but not limited to, a tablet, a smartphone, a phablet, or the like. By way of another example, the PED 400 may be any computer or computing device including one or more processors and memory. For instance, the PED 400 may be a convertible laptop including, but not limited to, a laptop with a single-fold hinge, a laptop with a double-fold hinge, a laptop with a twist-and-fold hinge, a laptop with a detachable display device and/or a detachable user input device, or the like.

The aircraft tray table 100 may be configured to support the PED 400 in either a portrait mode or a landscape mode when the front section 106 is in the PED position.

For example, where the PED 400 is a tablet or other larger device, the PED 400 may make contact with an edge 402 of the front section 106 and the one or more bumpers 130 of the rear section 104. It is noted herein the PED 400 may make contact with the one or more bumpers 130 in addition to or instead of the upper surface 132 of the rear section 104.

By way of another example, where the PED 400 is a smartphone or other smaller device, the PED 400 may make contact with the upper surface 134 of the front section 106 and fit within a groove or recess 404 within the upper surface 132 of the rear section 104.

At least a portion of the upper surface 132 of the rear section 104 may include a non-slip material 406. For example, the non-slip material 406 may be positioned proximate to the one or more bumpers 130. By way of another example, the non-slip material 406 may be in place of the recess 404.

At least a portion of the upper surface 134 of the front section 106 may include a non-slip material 408. For example, the non-slip material 406 may be positioned approximately where the PED 400 may make contact with the upper surface 134.

It is noted herein the aircraft tray table 100 may include any combination of the one or more bumpers 130, the recess 404, the non-slip material 406, and/or the non-slip material 408.

In this regard, the cabin attendant aircraft tray table 100 is installable in the cabin attendant aircraft seat assembly 300 when in use. The cabin attendant aircraft tray table 100 is removable from and stowable within the footprint of the cabin attendant aircraft seat assembly 300 defined by the frame 308 when not in use. The cabin attendant aircraft tray table 100 is low-profile to reduce an amount of required storage and thus maintain the footprint of the cabin attendant aircraft seat assembly 300. The cabin attendant aircraft tray table 100 is multi-functional, being configured to hold a variety of sizes of PED 400.

Although embodiments of the disclosure illustrate the cabin attendant aircraft tray table 100 being used with a cabin attendant aircraft seat assembly 300 installed within an aircraft cabin, it is noted herein, the cabin attendant aircraft tray table 100 and/or components of the cabin attendant aircraft tray table 100 are not limited to the aviation environment and/or the aircraft components within the aviation environment. For example, the cabin attendant aircraft tray table 100 and/or components of the cabin attendant aircraft tray table 100 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the cabin attendant aircraft tray table 100 and/or components of the cabin attendant aircraft tray table 100 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A cabin attendant aircraft tray table, comprising:
a front section of a body with a first upper surface;
a rear section of the body with a second upper surface; and
at least one hinge coupling the front section and the rear section, the at least one hinge comprising:
a hinge body;
a first shaft coupling the rear section to the hinge body, the first shaft including at least one bearing; and
a second shaft coupling the front section to the hinge body, the second shaft including at least one additional bearing,
the front section being configured to actuate relative to the rear section via the at least one hinge between a stowed position, a personal electronic device (PED) position, and a tray position,
the front section and the rear section being in separate planes when the front section is in the stowed position,
the first upper surface of the front section being proximate to the second upper surface of the rear section when the front section is in the stowed position,
the front section being held in place relative to the rear section via a mechanical assembly when the front section is in the PED position, the front section and the rear section being configured to receive and support a PED when the front section is in the PED position,
the first upper surface of the front section and the second upper surface of the rear section forming a co-planar surface when the front section is in the tray position.

2. The cabin attendant aircraft tray table of claim 1, further comprising:
at least one bumper coupled to the second upper surface of the rear section, the at least one bumper being configured to receive and support the PED when the front section is in the PED position.

3. The cabin attendant aircraft tray table of claim 1, further comprising:
at least one recess inset within the second upper surface of the rear section, the at least one recess being configured to support the PED when the front section is in the PED position.

4. The cabin attendant aircraft tray table of claim 1, the mechanical assembly including at least one ball detent, the at least one ball detent being configured to engage at least one notch on the hinge body when the front section is in at least one of the stowed position or the PED position.

5. The cabin attendant aircraft tray table of claim 1, a first angle between the front section and the hinge body being configured to remain unchanged as the front section actuates between the stowed position and the PED position, a second angle between the rear section and the hinge body being configured to change as the front section actuates between the stowed position and the PED position.

6. The cabin attendant aircraft tray table of claim 1, a first angle between the front section and the hinge body being configured to change as the front section actuates between the PED position and the tray position, a second angle between the rear section and the hinge body being configured to remain unchanged as the front section actuates between the PED position and the tray position.

7. The cabin attendant aircraft tray table of claim 1, further comprising:
an interlocking assembly including a first component on the front section and a second component on the rear section,
an engaging by a first surface on the first component of a second surface on the second component preventing the front section from actuating past the tray position where the front section and the rear section are co-planar.

8. The cabin attendant aircraft tray table of claim 1, further comprising:
at least one fitting coupled to the rear section, the at least one fitting being configured to be inserted into at least one corresponding receiver on at least one armrest of a cabin attendant aircraft seat assembly,
the cabin attendant aircraft tray table being stowable in a cavity defined within a frame of the cabin attendant aircraft seat assembly when the front section is in the stowed position.

9. A cabin attendant aircraft seat assembly, comprising:
a frame;
a cabin attendant aircraft seat coupled to the frame;
at least one armrest proximate to the cabin attendant aircraft seat and coupled to the frame; and
a cabin attendant aircraft tray table, the cabin attendant tray table comprising:
a front section of a body with a first upper surface;
a rear section of the body with a second upper surface;
at least one fitting coupled to the rear section, the at least one fitting being configured to be inserted into at least one corresponding receiver on the at least one armrest; and
at least one hinge coupling the front section and the rear section, the at least one hinge comprising:
a hinge body;
a first shaft coupling the rear section to the hinge body, the first shaft including at least one bearing; and
a second shaft coupling the front section to the hinge body,
the second shaft including at least one additional bearing,
the front section being configured to actuate relative to the rear section via the at least one hinge between a stowed position, a personal electronic device (PED) position, and a tray position,
the cabin attendant aircraft tray table being stowable in a cavity defined within the frame when the front section is in the stowed position,
the front section being held in place relative to the rear section via a mechanical assembly when the front section is in the PED position, the front section and the rear section being configured to receive and support a PED when the front section is in the PED position,
the first upper surface of the front section and the second upper surface of the rear section forming a co-planar surface when the front section is in the tray position.

10. The cabin attendant aircraft seat assembly of claim 9, further comprising:
at least one cut-out within the frame, the at least one cut-out providing access to the cavity defined within the frame in which the cabin attendant aircraft tray table is stowable when the front section is in the stowed position.

11. The cabin attendant aircraft seat assembly of claim 10, the at least one cut-out conforming to a perimeter of the cabin attendant aircraft tray table defined when the front section is in the stowed position, the perimeter including at least one projection corresponding to at least one feature of the cabin attendant aircraft tray table, the at least one feature including the at least one fitting.

12. The cabin attendant aircraft seat assembly of claim 9, the frame comprising:
a first set of rails within the defined cavity, the first set of rails being configured to receive a first portion of the cabin attendant aircraft tray table; and
a second set of rails within the defined cavity, the second set of rails being configured to receive a second portion of the cabin attendant aircraft tray table.

13. The cabin attendant aircraft seat assembly of claim 12, the first set of rails including two rails with co-planar surfaces configured to receive the first portion of the cabin attendant aircraft tray table, the second set of rails including two rails with surface separated by a distance and configured to receive the second portion of the cabin attendant aircraft tray table.

14. The cabin attendant aircraft seat assembly of claim 13, the front section and the rear section of the cabin attendant aircraft tray table being in separate planes when the front section is in the stowed position, the first upper surface of the front section being proximate to the second upper surface of the rear section when the front section is in the stowed position.

* * * * *